United States Patent
Kurosaki

(10) Patent No.: US 7,591,559 B2
(45) Date of Patent: Sep. 22, 2009

(54) IMAGE PROJECTOR AND A LIGHT SOURCE FOR USE IN THE PROJECTOR

(75) Inventor: Hideyuki Kurosaki, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 526 days.

(21) Appl. No.: 11/441,986

(22) Filed: May 26, 2006

(65) Prior Publication Data

US 2006/0268546 A1 Nov. 30, 2006

(30) Foreign Application Priority Data

May 31, 2005 (JP) .............................. 2005-159277

(51) Int. Cl.
G03B 21/26 (2006.01)
G03B 21/28 (2006.01)
F21V 7/04 (2006.01)
G02B 6/00 (2006.01)
G09F 13/00 (2006.01)
H01L 31/00 (2006.01)

(52) U.S. Cl. ........................... 353/94; 353/98; 362/551; 362/555

(58) Field of Classification Search .................. 353/98, 353/94, 81; 362/551, 561, 235, 227, 240, 362/243, 231, 230; 385/146, 901
See application file for complete search history.

(56) References Cited

U.S. PATENT DOCUMENTS

| | | | | |
|---|---|---|---|---|
| 6,952,162 B2* | 10/2005 | Monck et al. | ............... | 340/464 |
| 6,956,701 B1* | 10/2005 | Peterson et al. | ............. | 359/618 |
| 7,077,525 B2* | 7/2006 | Fischer et al. | ................. | 353/43 |
| 7,165,867 B2* | 1/2007 | Long et al. | ................... | 362/328 |
| 7,349,095 B2* | 3/2008 | Kurosaki | .................... | 356/445 |
| 2001/0017776 A1* | 8/2001 | Solodovnokov et al. | ..... | 362/259 |

FOREIGN PATENT DOCUMENTS

| JP | 62-018775 A | 1/1987 |
|---|---|---|
| JP | 06-243703 A | 9/1994 |
| JP | 2000-231344 A | 8/2000 |
| JP | 2003-262795 A | 9/2003 |
| JP | 2004-014367 A | 1/2004 |

OTHER PUBLICATIONS

Japanese Office Action (and English translation thereof) dated Oct. 7, 2008, issued in a counterpart Japanese Application.

* cited by examiner

*Primary Examiner*—William C Dowling
*Assistant Examiner*—Ryan Howard
(74) *Attorney, Agent, or Firm*—Frishauf, Holtz, Goodman & Chick, P.C.

(57) ABSTRACT

A light source comprising a prismoidal housing with inclined sides of a flight of steps and with a closed smaller base and an open larger base. The entire inner surface of the housing is made of an optically reflective material. A plurality of light emitting elements are arranged on the smaller base of the prismoidal housing and the respective risers of the steps of each flight such that the plurality of light emitting elements emit rays of light toward the open large base of the housing.

18 Claims, 8 Drawing Sheets

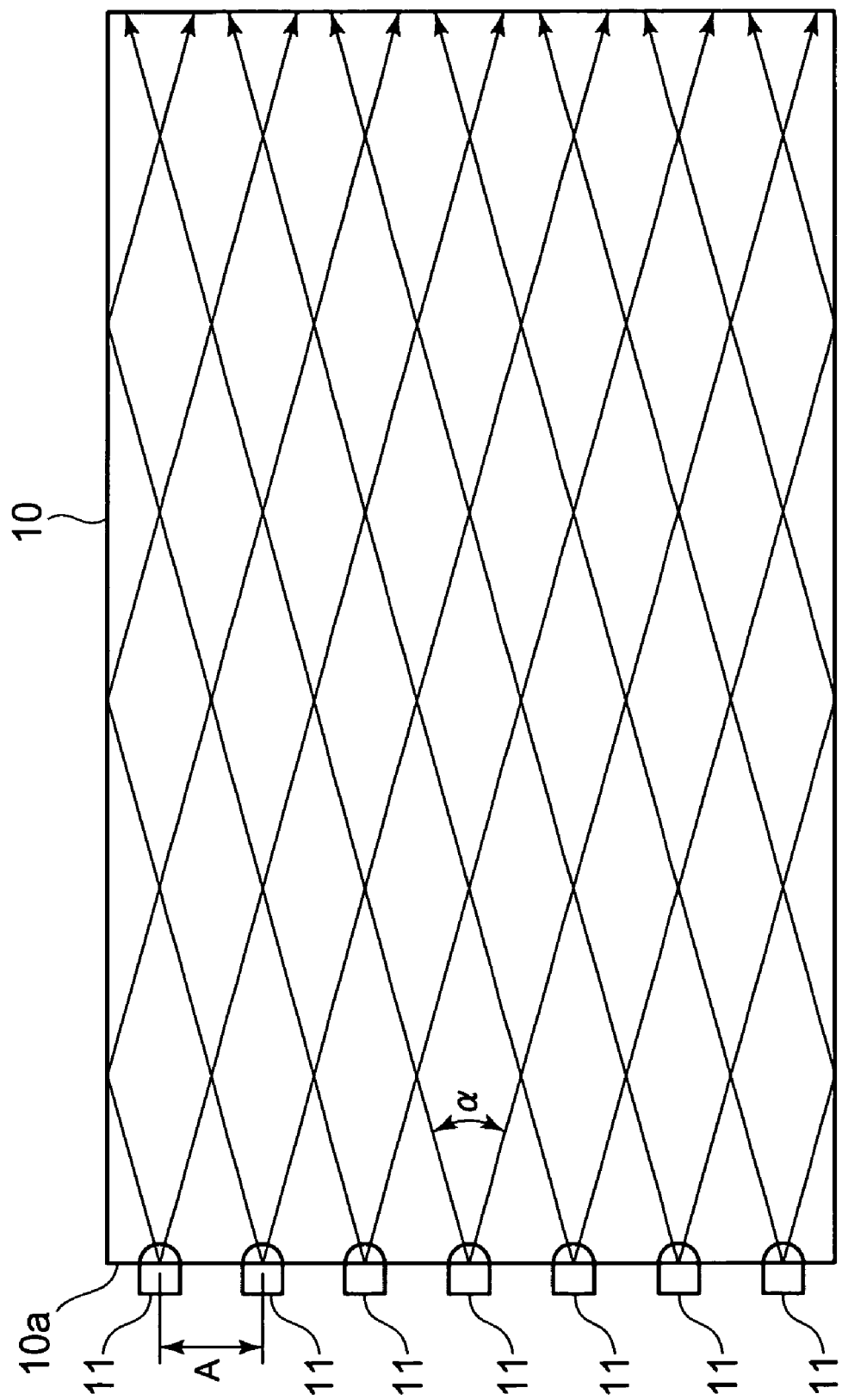

IMAGE PROJECTOR AND A LIGHT SOURCE FOR USE IN THE PROJECTOR

BACKGROUND OF THE INVENTION

1. Field of the Invention

The present invention relates to image projectors of a DLP (trademark) type and light sources for use in the projectors.

2. Background Art

In the past, most of image projectors use a discharge lamp such as superhigh pressure mercury lamp as a light source. However, they consume a large amount of electric power and produces a large amount of heat and a considerable amount of noise for cooling the projectors. They will be deteriorated easily unless appropriately cooled, and are expensive and not easy to use.

Recently, red, green and blue high-brightness solid light emitting diodes that produce the respective corresponding colored rays of light are widely put to practical use and tried to be used as light sources for the projectors.

Compared to the superhigh pressure mercury lamp, a single LED provides a low brightness. Thus, an important problem with a light source for the projector is how many LEDs can be disposed in a small space.

FIG. 8 shows a light source for use in the prior art projector. In this light source, seven lensed LEDs 11 are arranged at intervals of A for heat radiation purposes on a plate 10a provided at a left end of a light tunnel 10. The whole inner surface of the light tunnel 10 is made of a reflective mirror. The respective LEDs 11 emit rays of light at the divergent angle of α and are reflected by the inner surface of the light tunnel 10. The brightness distribution of the rays of light is equalized as they propagate rightward through the tunnel 10. Such rays of light are used to illuminate an optical modulator such as a digital micromirror device (trademark) (not shown), thereby forming an optical image, which is then projected through a projector lens system (not shown) onto a display screen (not shown)

With such simple regular arrangement of LEDs 11 at the intervals of A on the end of the housing, the number of LEDs to be disposed is limited. Thus, they cannot compose a light source that provides a satisfactory brightness for the projector.

Similarly, use of an array of red, green and blue LEDs as a light source is proposed. For example, Japanese Patent Publication 2003-262795 discloses an illumination panel that comprises an array of red, green and blue LEDs disposed at an inlet end of a rectangular-cross-sectional rod lens whose inner surface is optically reflective in order to provide rays of light of uniform brightness distribution. The effective panel size of this illumination panel is equal to the open end size of the rod lens, and the number of LEDs to be disposed is limited.

SUMMARY OF THE INVENTION

Briefly stated, in one aspect, the present invention provides a light source comprising a prismoidal housing with inclined sides of a flight of steps and a closed smaller base and an open larger base. The entire inner surface of the housing is made of an optically reflective material. A plurality of light emitting elements are arranged on the smaller base of the prismoidal housing and the respective risers of the steps of each flight such that the plurality of light emitting elements emit rays of light toward the open larger base of the housing.

In another aspect, the present invention provides an image projector comprising the just mentioned light source, an optical driver for causing the plurality of light emitting elements of the light source to emit rays of light, and an optical modulator for forming an optical image based on rays of light emitted by the plurality of light emitting elements. In addition, a projection subunit is provided for projecting the optical image formed by the optical modulator onto a display screen.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 8 is the general prior art LED light source where LEDs are arranged on an end of a light tunnel.

DETAILED DESCRIPTION OF THE INVENTION

Figure 1:
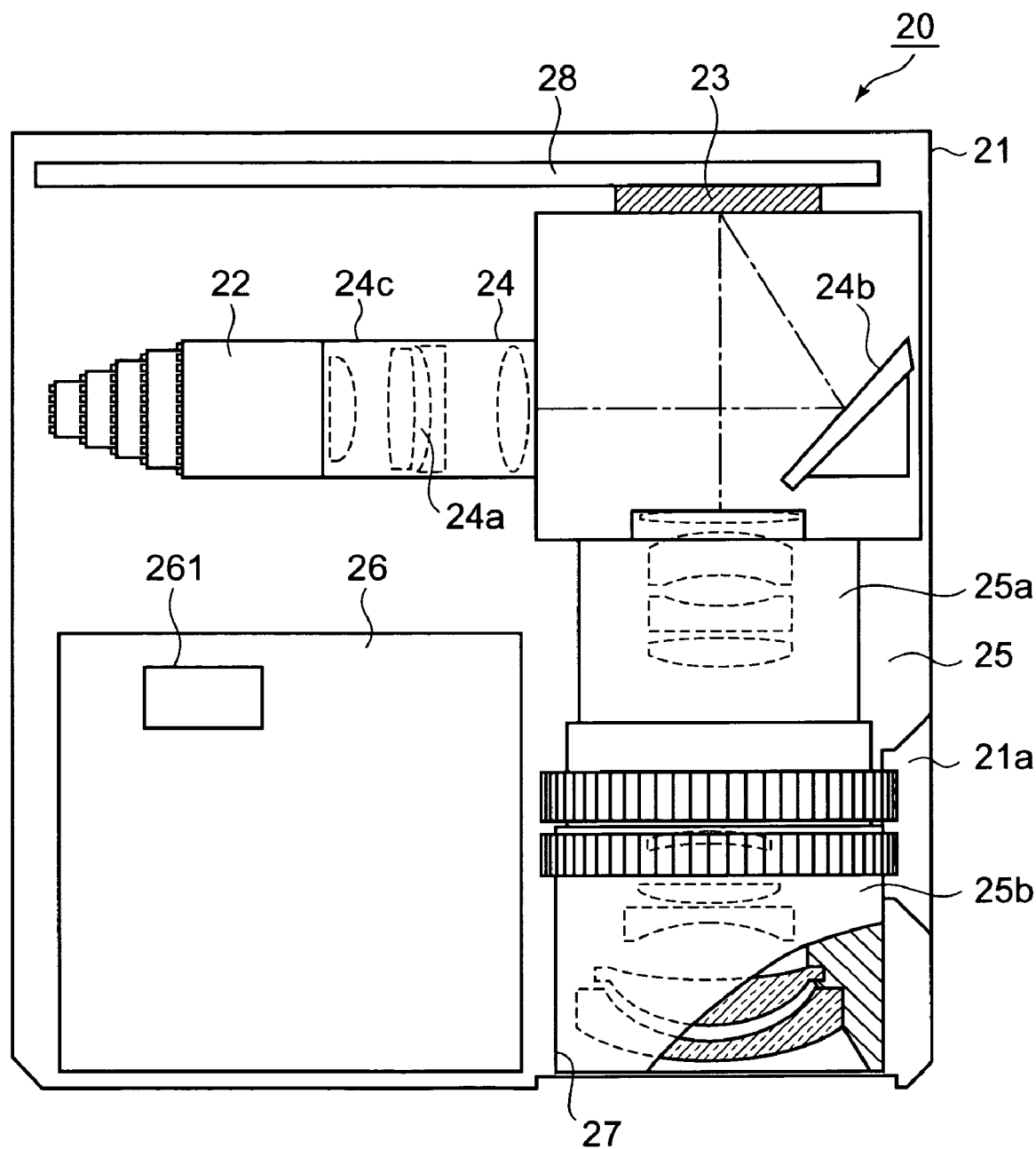
FIG. 1 is a partially cross-sectional plan view of an image projector according to one embodiment of the present invention.

One embodiment of an image projector 20 according to the present invention will be described with reference to the drawings. FIG. 1 is a partially cross-sectional plan view of the projector 20. In the projector 20, a light source 22 is disposed within a rectangular case 21 in its upper left area. A rectangular optical modulator or display device 23 is disposed within the case 21 in the vicinity of an upper right corner so as to face a projection exit 27 provided at a lower right part of the case 21. The optical modulator 23 has a display area of a plurality of pixels disposed in rows and columns in a matrix such that the display area faces the projection exit 27. The optical modulator 23 controls reflected parts of rays of light incident to the plurality of pixels, thereby composing and displaying an image.

A light-source side optical system 24 is provided so as to cause rays of light from the light source 22 to pass therethrough to the optical modulator 23. A projector lens device 25 is provided within the case 21 in its lower right area such that rays of light from the optical modulator 23 are projected therethrough onto the screen (not shown). A power source 26 that includes a light emission driver 261 that causes the light source 22 to emit rays of light is disposed within the case 21 in its lower left area.

Figure 2:
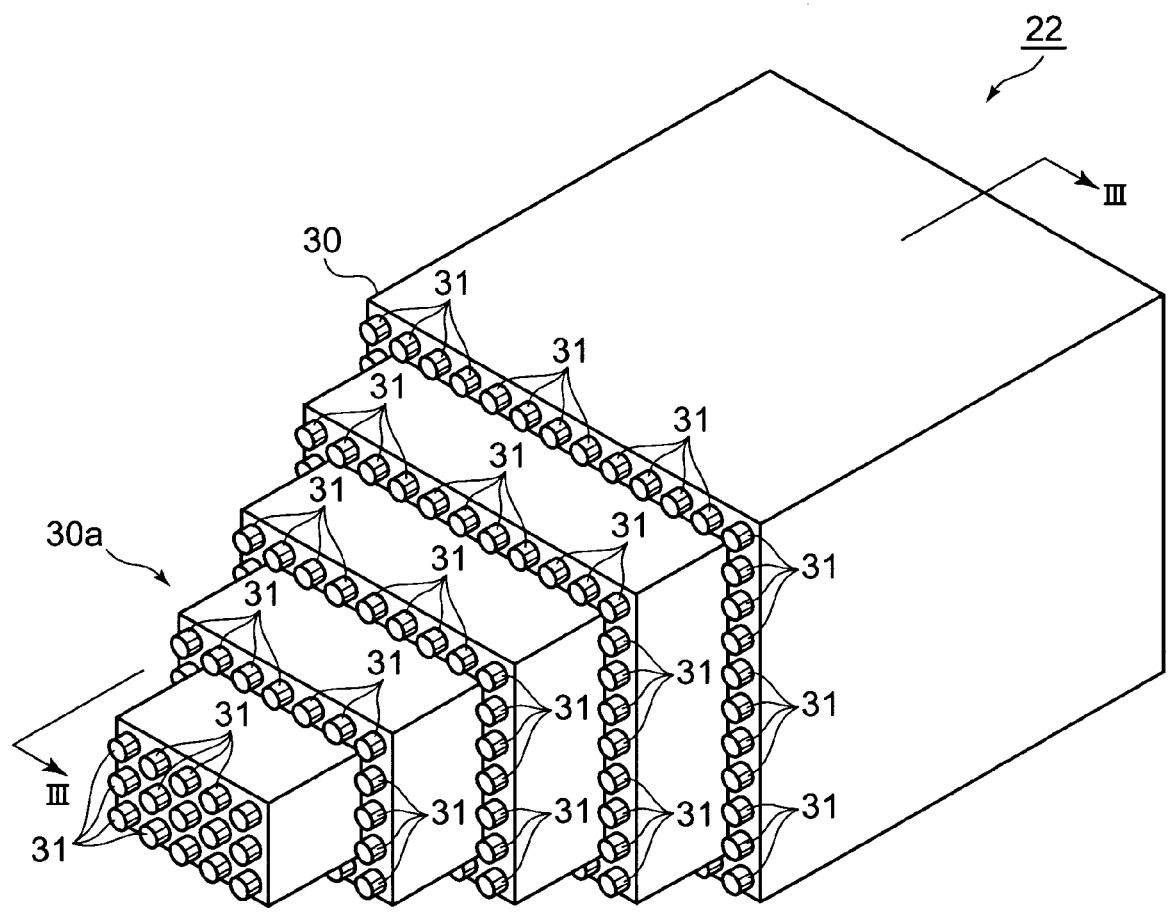
FIG. 2 is a perspective view of a light source of the projector.
Figure 3:
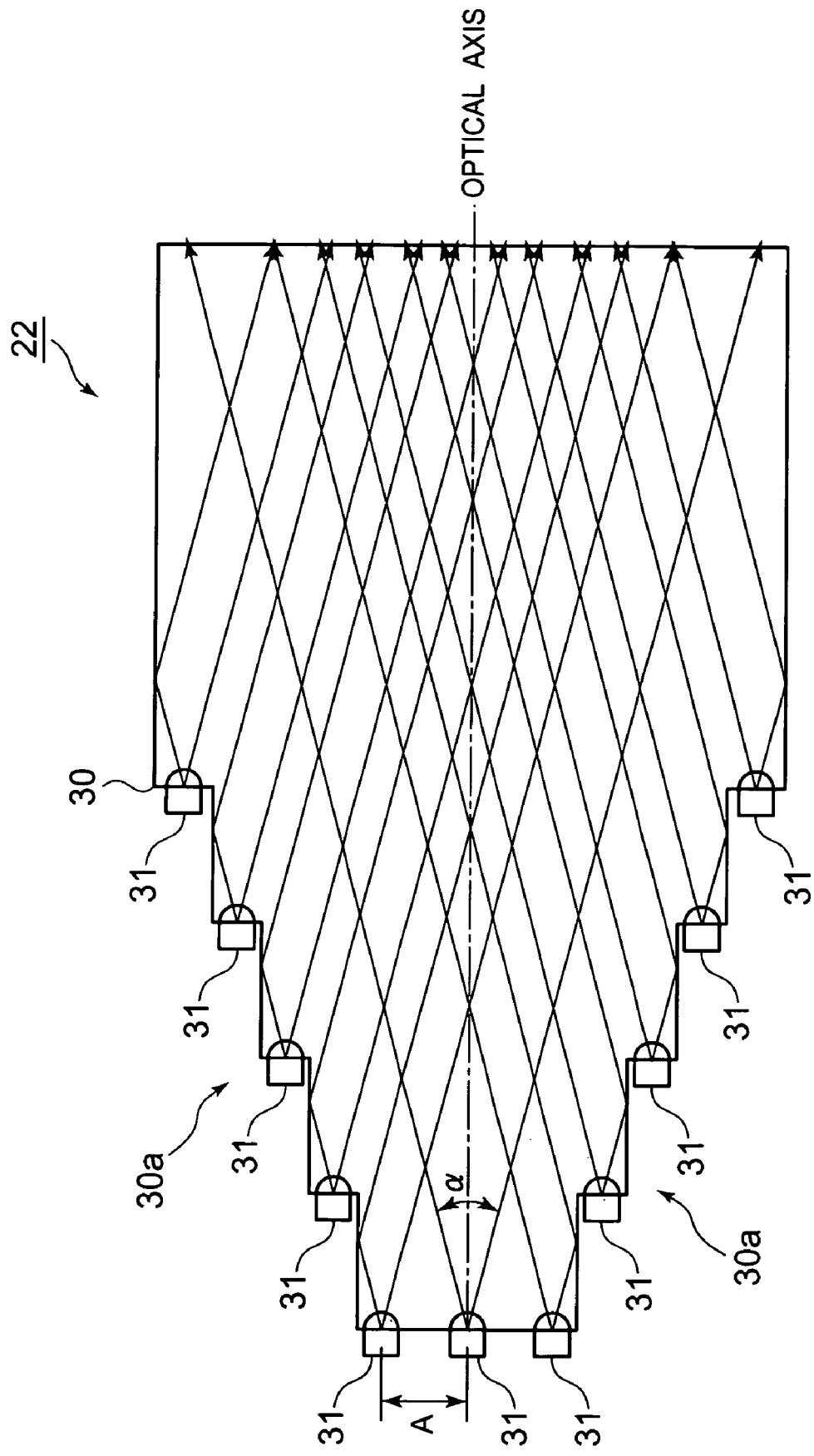
FIG. 3 is a cross-sectional view taken along a line III-III of FIG. 2.

More specifically, referring to FIGS. 2 and 3, the light source 22 has a prismoidal housing 30 with four inclined sides each comprising a flight of steps 30a with a horizontal optical axis passing through the centers of the smaller and larger bases. The larger base of the housing 30 is open and has an aspect ratio of 3:4 similar to that of a projected image. A plurality of lensed LEDs 31 are arranged in a dispersive manner in accordance with the colors of their emitted rays of light on the smaller base of the housing 30 and the risers of steps of each flight 30a such that the respective light emission axes of the LEDs 31 are parallel to the optical axis of the housing 30. The treads of steps involving the rightmost LEDs 31 are longest among the treads of all the steps, thereby forming a light tunnel that renders a brightness distribution of the rays of light uniform. As obvious from FIG. 3, the risers and treads of the steps are perpendicular and parallel, respectively, to the optical axis of the housing 30.

When each lensed LED 31 has a light emission divergent angle of α, as shown in FIG. 3, the rays of light emitted by the LED 31 are reflected once or more by the inner surface of the housing 31 in a range of ±α/2 and then reach the light-source side optical system 24.

Actually, the LEDs 31 shown in FIGS. 2 and 3 include red, green and blue LEDs disposed in a dispersive manner and the LEDs of the same color are driven at the same time so as to emit corresponding colored light. When all the red, green and blue LEDs 31 are driven at the same time, they emit corresponding colored rays of light, which are then mixed so as to be provided as white light from the light source 22. To this end, the ratio in number of red, green and blue LEDs are determined in consideration of the respective brightness and spectral characteristics of the red, green and blue LEDs.

The display device 23 (see FIG. 1) has no coloring means such as color filters and in this embodiment comprises a DMD (Digital Micromirror Device) (registered trademark). The micromirror device 23, whose structure is not shown, comprises a plurality of pixels each composed of a very thin metal micromirror (for example, of aluminum) 10 μm×20 μm driven by a CMOS-based mirror driver.

Each micromirror is switched repeatedly so as to take two different directions alternately such that rays of light incident on the micromirror that are directed in the respective two directions are reflected as bright and dark pixel images in the forward and inclined directions, respectively. The brightness of the pixel image reflected in the forward direction can be changed in a gradational manner by adjusting a time duration in which the micromirror is directed so as to reflect the rays of light. That is, the three groups of red, green and blue LEDs 31 are driven in a repeated and time-divisional manner and hence the micromirror device 23 is caused to display in a gradational manner images of red, green and blue colors based on the corresponding colored rays of light emitted by the three respective groups of LEDs 31, thereby projecting a full-color image onto the display screen (not shown).

The light-source side optical system 24 that causes the rays of light emitted by the light source 22 to pass therethrough to the micromirror device 23 comprises a light-source side lens system 24a that causes rays of light emitted by the light source 22 to pass therethrough and a plane mirror 24b provided on the optical axis of the optical system 24 in an upper right area within the housing 21 at an angle of 45 degrees to the optical axis of the lens system 24a, thereby receiving and reflecting the rays of light from the lens system 24a towards the display device 23. The light-source side lens system 24a comprises a plurality of lens having the same optical axis disposed within a hollow cylinder 24c connected to the larger open base of the light source 22.

The optical image formed by the micromirror device 23 is adjusted with respect to its focusing position and zooming image angle and projected and displayed onto the display screen (not shown).

The projection lens system 25 comprises an incident-side fixed cylinder 25a containing lenses and an outgoing-side hollow cylinder 25b containing lenses and engaged with the fixed cylinder 25a so as to be movable coaxially with the fixed cylinder 25a by rotating the movable cylinder 25b such that the focusing position and zooming image angle of the lens system 25 may be changed by a motor (not shown) or by turning the movable cylinder 25b manually in a cutoff 21a formed in the case 21 at the boundary between the fixed and movable cylinders 25a and 25b.

A display/acoustic circuit board 28 is provided between the micromirror device 23 and a nearby wall of the case 21 and connected to an input/output connector for USB terminals, input terminals for a color image signal and an acoustic signal, a video signal input terminal (not shown). The circuit board 28 is also connected to the micromirror device 23, and the motor (not shown) for driving the outgoing-side movable lens cylinder 25b of the lens system 25.

The three groups of red, green and blue LEDs 31 of the light source 22 are driven in a time-divisional manner so as to emit red, green and blue rays of light sequentially, which are then reflected and applied by the mirror 24b toward the micromirror device 23. In synchronization with the application of red, green and blue rays of light, the micromirror device 23 sequentially displays red, green and blue images, which are then enlarged by the projection lens 25 and projected onto the display screen (not shown), thereby superposing the three different-colored images and forming a full-color image.

As described above, according to the embodiment, many LEDs are disposed in a dispersive manner in accordance with the colors of their emitted rays of light at intervals of A for heat-radiation purposes on the smaller base and the respective risers of steps of a flight 30a formed on each of the sides of the prismoidal housing. Thus, the number of LEDs disposed has increased compared to the light source of FIG. 8. Therefore, the cross-sectional area of the light source housing 22 is reduced compared to the prior art one of FIG. 8. Accordingly, the light source has a compact structure.

In addition, as shown in FIGS. 2 and 3, the rightmost treads have a large length compared to the other treads, and function as a light tunnel for equalizing a brightness distribution of the rays of light.

(Modifications)

Several modifications of the present light source will be described below with reference to their peculiar structural points different from each other and those of the embodiment, and further description of their other structural points similar to each other and those of the embodiment will be omitted. Like reference numerals denote like parts throughout the several figures of the drawings.

(First Modification)

Figure 4:
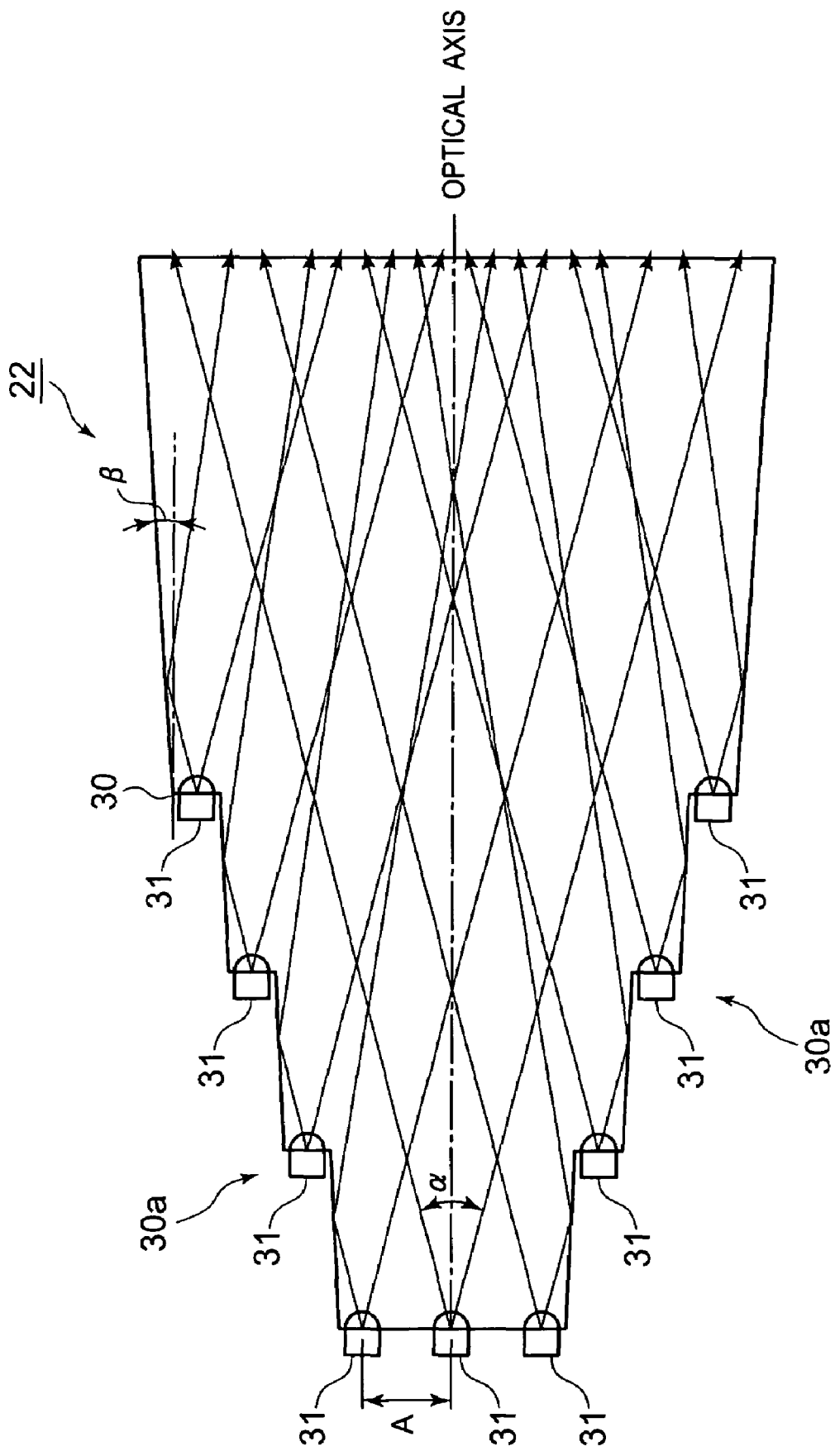
FIG. 4 is a cross-sectional view of a first modification of the embodiment.

In the first modification of FIG. 4, the respective treads of steps of a flight 30a formed on each of the inclined sides of the prismoidal housing 30 are divergent at an angle of β to the optical axis of the housing 30 toward the right exit of the housing 30. Other structural points are the same as the corresponding ones of the light source of FIGS. 2 and 3.

Thus, in FIG. 4 the rays of light emitted by the LEDs 31 are reflected by the inner surfaces of the treads of steps formed on the inclined sides of the housing 30 and become more parallel to the optical axis of the housing. Therefore, the rays of light exiting from the light tunnel of the housing 30 composed of the rightmost treads include many components substantially parallel to the optical axis of the housing 30 and easily and efficiently captured by the lens system 24a of a next-stage optical-source side optical system 24 even when an allowable angular range in which the lens system 24a captures the rays of light is small. Thus, the rays of light including many components made substantially parallel to the optical axis of the housing 30 are easily reflected by the mirror 24b toward the micromirror device 23. As a result, the lenses of the optical system 24a contained within the lens cylinder 24c are reduced in diameter.

(Second Modification)

Figure 5:
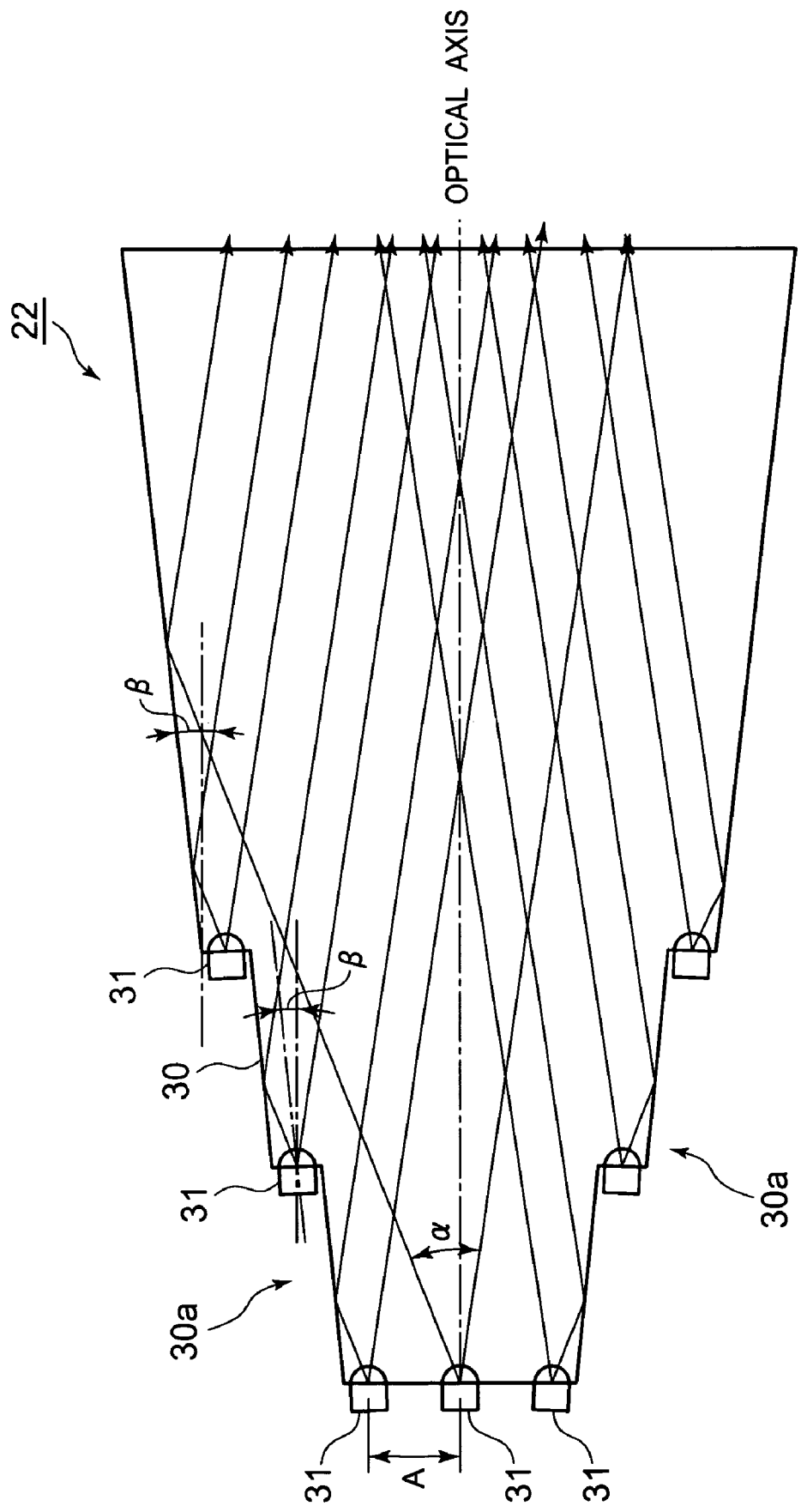
FIG. 5 is a cross-sectional view of a second modification.

In the second modification of FIG. 5, the light source 22 has the same structure as those of FIG. 4 except that the LEDs 31 disposed at the respective risers of steps of a flight 30a formed on each of the inclined sides of the prismoidal housing 30 have an emission axis parallel to divergent treads of the steps concerned. That is, the emission axis of each LED has the same divergent angle of β as the tread of a step concerned.

Thus, compared to FIG. 4, the rays of light emitted by the LEDs 31 are reflected by the inner surfaces of the step treads of the housing 30 and become more parallel to the optical axis of the housing 30. Thus, the rays of light exiting from the light tunnel composed of the rightmost treads include much more components substantially parallel to the optical axis of the housing 30.

Thus, even when an allowable range of an angle in which the lens system 24a of the light-source side optical system 24 can capture the rays of light is small, the rays of light from the light source 22 are efficiently captured, easily converted to parallel ones and caused to pass through the mirror 24b to the micromirror device 23. As a result, the optical lenses composing the light-source side lens system 24a disposed within the lens support cylinder 24c are reduced in diameter.

(Third Modification)

Figure 6:
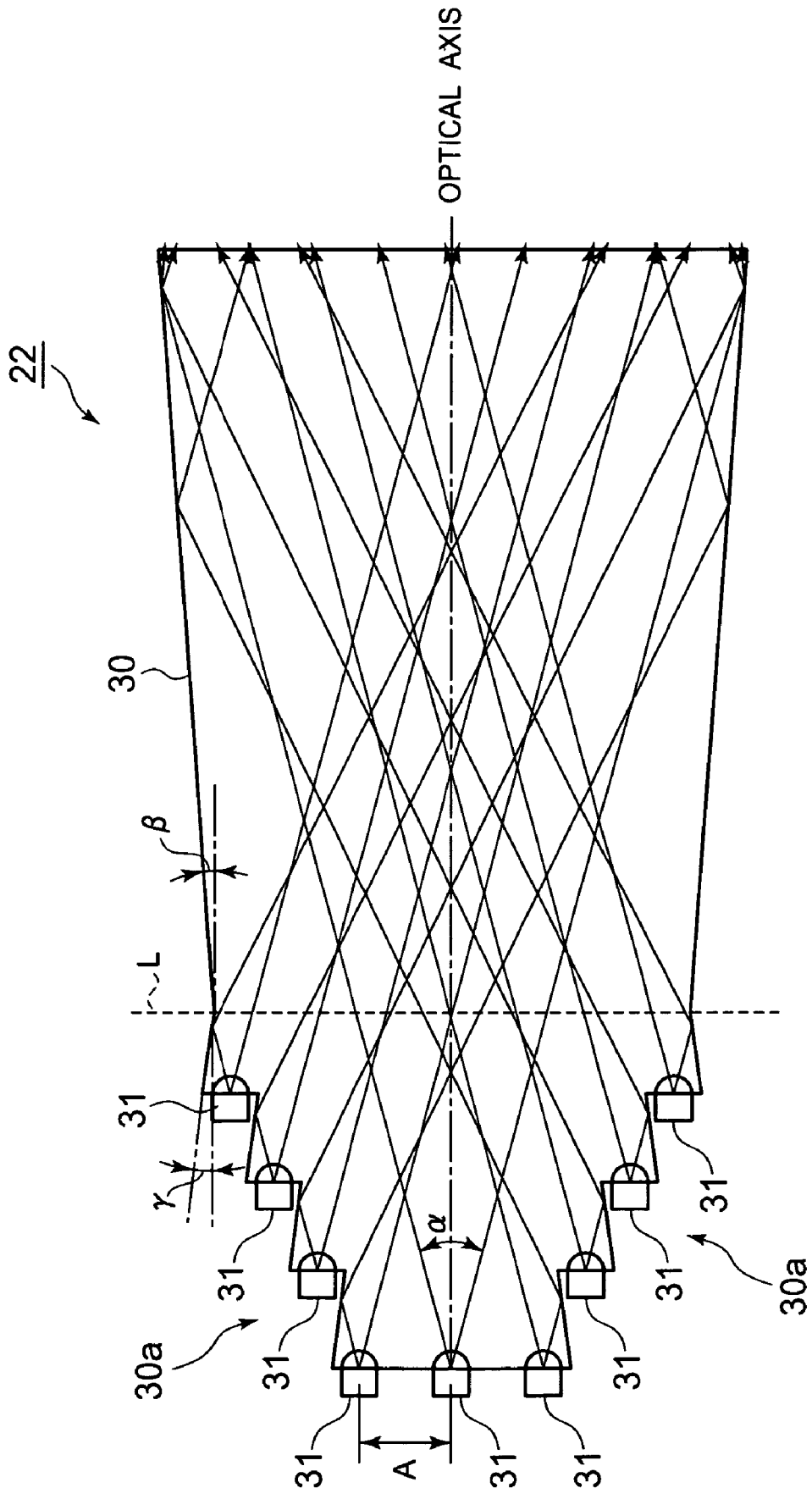
FIG. 6 is a cross-sectional view of a third modification.

The third modification of FIG. 6 has the same structure as that of FIG. 4 except that the respective treads of the steps of the flight 30a formed on each of the inclined sides of the prismoidal housing 30 are convergent at an angle of γ to the optical axis of the housing 30 toward its larger open base or exit and then the rightmost treads start to diverge at a point L at an angle of β to the optical axis of the housing 30 toward its exit.

Rays of light emitted by the LEDs 31 and reflected by the respective inner surfaces of the treads of the steps formed on the inclined sides of the housing 30 on the left side of the point L have increased components for the angle of γ perpendicular to the optical axis of the housing 30 and are collected upstream of the point L. Then, when the rays of light propagate from a plane including the point L rightward to the housing exit along the optical axis of the housing 30, they are reflected once or more by the inner surfaces of the rightmost treads. Thus, components of the rays of light for the angle of β parallel to the optical axis of the housing 30 increase as a whole and then enter the light-source side optical system 24. During this propagation of the rays of light, their brightness distribution is much more equalized.

Thus, the rays of light emitted through the exit of the housing 30 of this modification and reaching the optical system 24 are further equalized with respect to the brightness distribution thereof compared to the light tunnel of the housing 30 of FIG. 3. Thus, the quality of an image projected by the projector 20 using the light source 22 of this modification is improved.

Figure 7:
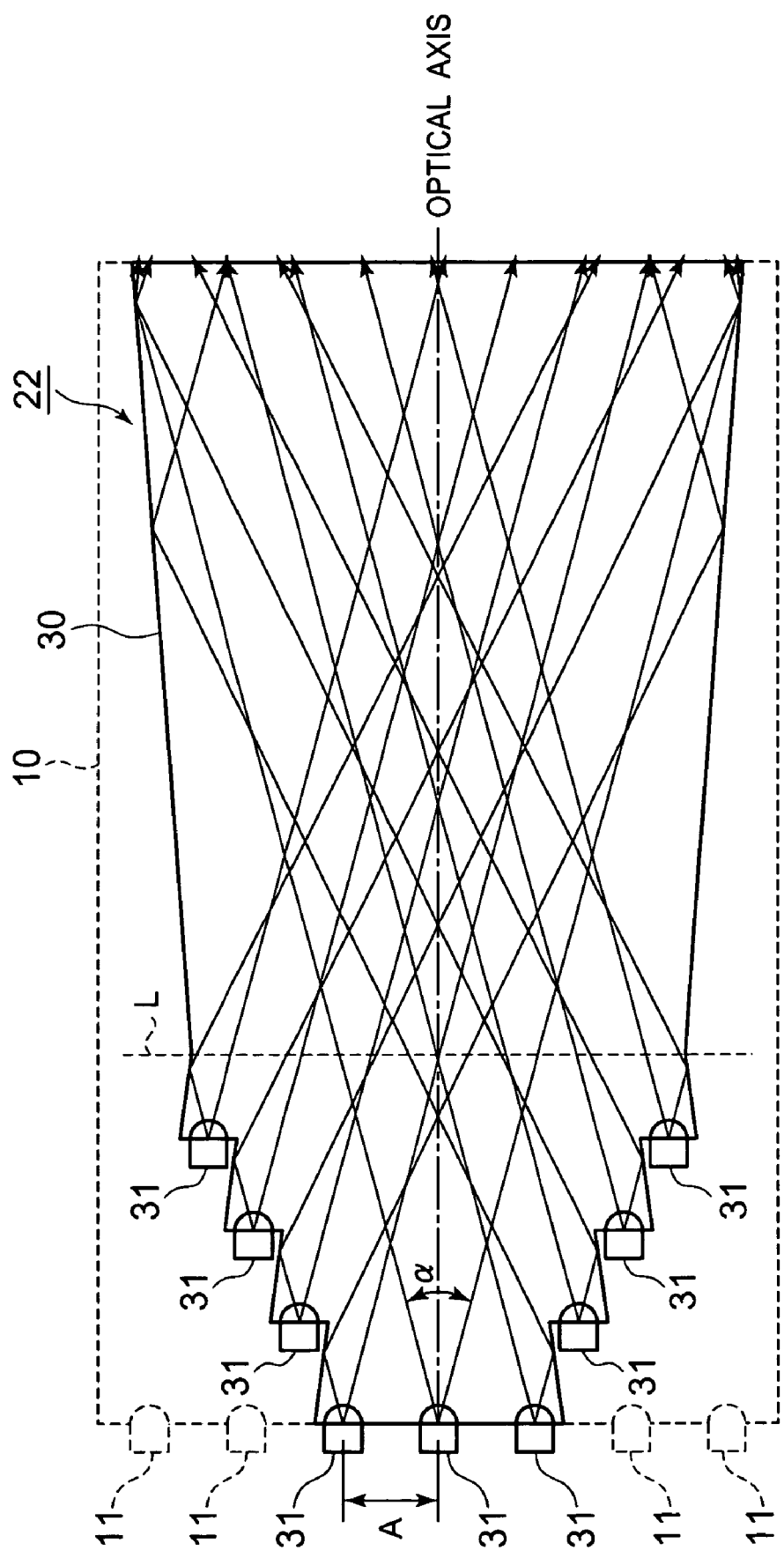
FIG. 7 shows the third modification and the prior art LED light source in a comparative manner.

FIG. 7 shows comparison between the light source housing 30 of FIG. 6 and the general prior-art LED light source of FIG. 8. In the light housing 10 of FIG. 8, only seven LEDs 11 are provided on the left end of the housing 10 at intervals of A whereas in the present embodiment nine LEDs 31 are disposed at the intervals of A on the left end and respective risers of the steps of the housing 30, which provides a compact structure of the light source.

While the light source housing 30 is illustrated as taking the form of a hollow prismoid whose larger base is open with inclined sides of a flight of steps 30a, the present invention is not limited to this particular case. For example, the light source 22 may comprise a solid prismoid of optical glass or plastic with a flight of steps formed on each of the inclined sides of the prismoid covered with an aluminum film so as to form an inner mirror surface, and a plurality of LEDs disposed on the smaller base of the prismoid and the respective risers of steps of the flights formed on the inclined sides of the prismoid such that the respective LEDs emit rays of light, which are then reflected once or more by the inner surface of the prismoid, thereby passing toward the larger end, or exit, of the prismoid.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-159277 filed on May 31, 2005 and including specification, claims, drawings and summary. The disclosure of the above Japanese patent application is incorporated herein by reference in its entirety.

What is claimed is:

1. A light source comprising:
   a prismoidal housing having: (i) inclined sides of a flight of steps, each step including a riser and a tread which have an angle therebetween, and (ii) a closed smaller base and an open larger base, wherein an entire inner surface of the housing is made of an optically reflective material; and
   a plurality of light emitting elements arranged on the smaller base of the prismoidal housing and on respective risers of the steps of each flight such that the plurality of light emitting elements emit rays of light toward the open larger base of the housing;
   wherein the respective treads of the steps formed on the inclined sides of the prismoidal housing are inclined so as to be divergent relative to an optical axis of the housing toward the open larger base of the housing, the optical axis passing though centers of the smaller and larger bases of the housing; and
   wherein the plurality of light emitting elements are disposed such that emission axes of the plurality of light emitting elements are parallel to the corresponding inclined treads.

2. The light source of claim 1, wherein the tread of one of the steps closest to the open larger base of the housing has a maximum length.

3. The light source of claim 1, wherein the open larger base of the housing has an aspect ratio of 3:4 to equalize a brightness distribution of the rays of light passing through the housing.

4. The light source of claim 1, wherein the plurality of light emitting elements comprise light emitting elements emitting red, green and blue rays of light.

5. A projector comprising:
   a light source comprising a prismoidal housing having: (i) inclined sides of a flight of steps, each step including a riser and a tread which have an angle therebetween, and (ii) a closed smaller base and an open larger base, wherein an entire inner surface of the housing is made of an optically reflective material; and wherein the light source further comprises a plurality of light emitting elements arranged on the smaller base of the prismoidal housing and on respective risers of the steps of each flight such that the plurality of light emitting elements emit rays of light toward the open larger base of the housing;

an optical driver for driving the plurality of light emitting elements of the light source to emit the rays of light;

an optical modulator for forming an optical image based on the rays of light emitted by the plurality of light emitting elements; and a projection subunit for projecting the optical image formed by the optical modulator onto a display screen.

6. The projector of claim 5, wherein the tread of one of the steps closest to the open larger base of the housing has a maximum length.

7. The projector of claim 5, wherein the respective treads of the steps formed on the inclined sides of the prismoidal housing are inclined so as to be divergent relative to an optical axis of the housing toward the open larger base of the housing, wherein the optical axis passes through centers of the smaller and larger bases of the housing.

8. The projector of claim 7, wherein the plurality of light emitting elements are disposed such that emission axes of the plurality of light emitting elements are parallel to the optical axis of the housing.

9. The projector of claim 6, wherein the respective treads of the steps formed on the inclined sides of the prismoidal housing, excluding the treads of the steps closest to the open larger base of the housing, are convergent relative to an optical axis of the housing toward the open larger base of the housing, and the treads of the steps closest to the open larger base of the housing are convergent and then divergent relative to the optical axis of the housing toward the open larger base of the housing.

10. The projector of claim 5, wherein the open larger base of the housing has an aspect ratio of 3:4 to equalize a brightness distribution of the rays of light passing through the housing.

11. The projector of claim 5, wherein the plurality of light emitting elements comprise light emitting elements emitting red, green and blue rays of light.

12. The projector of claim 5, wherein the optical driver drives the plurality of light emitting elements in a time-divisional manner for emitting corresponding colored rays of light.

13. A light source comprising:

a prismoidal housing having: (i) inclined sides of a flight of steps, each step including a riser and a tread which have an angle therebetween, and (ii) a closed smaller base and an open larger base, wherein an entire inner surface of the housing is made of an optically reflective material; and a plurality of light emitting elements arranged on the smaller base of the prismoidal housing and on respective risers of the steps of each flight such that the plurality of light emitting elements emit rays of light toward the open larger base of the housing;

wherein the respective treads of the steps formed on the inclined sides of the prismoidal housing, excluding the treads of the steps closest to the open larger base of the housing, are convergent relative to an optical axis of the housing toward the open larger base of the housing, and the treads of the steps closest to the open larger base of the housing are convergent and then divergent relative to the optical axis of the housing toward the open larger base of the housing.

14. The light source of claim 13, wherein each of the treads of the steps closest to the open larger base of the housing has a maximum length.

15. The light source of claim 13, wherein the open larger base of the housing has an aspect ratio of 3:4 to equalize a brightness distribution of the rays of light passing through the housing.

16. The light source of claim 13, wherein the plurality of light emitting elements comprise light emitting elements emitting red, green and blue rays of light.

17. The light source of claim 1, wherein each of the treads of the steps closest to the open larger base of the housing has a maximum length.

18. The light source of claim 5, wherein each of the treads of the steps closest to the open larger base of the housing has a maximum length.

* * * * *